May 23, 1967  J. E. HECKETHORN  3,321,051
SHOCK ABSORBER
Original Filed March 15, 1963  2 Sheets-Sheet 2
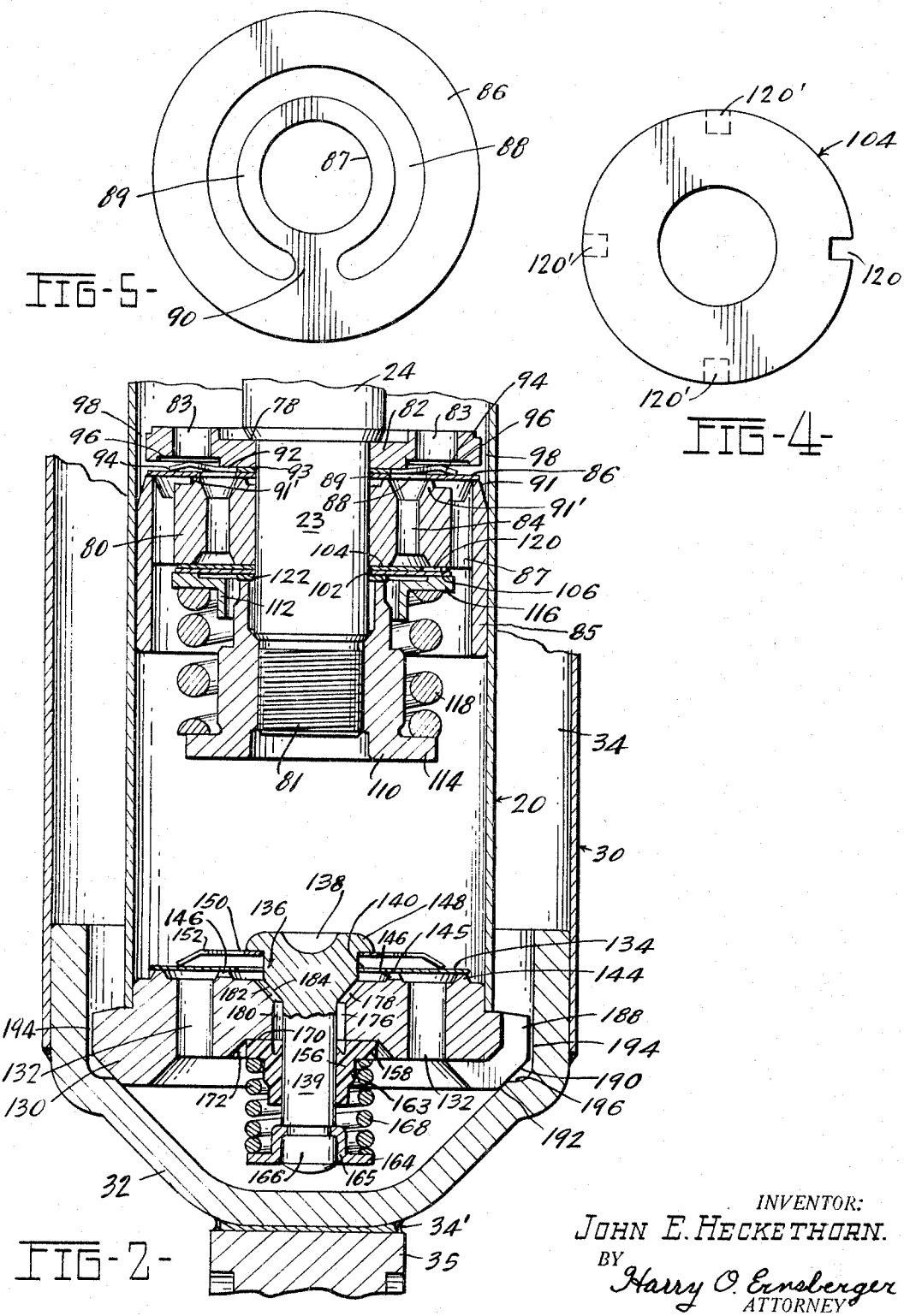
INVENTOR:
JOHN E. HECKETHORN.
BY
Harry O. Ernsberger
ATTORNEY

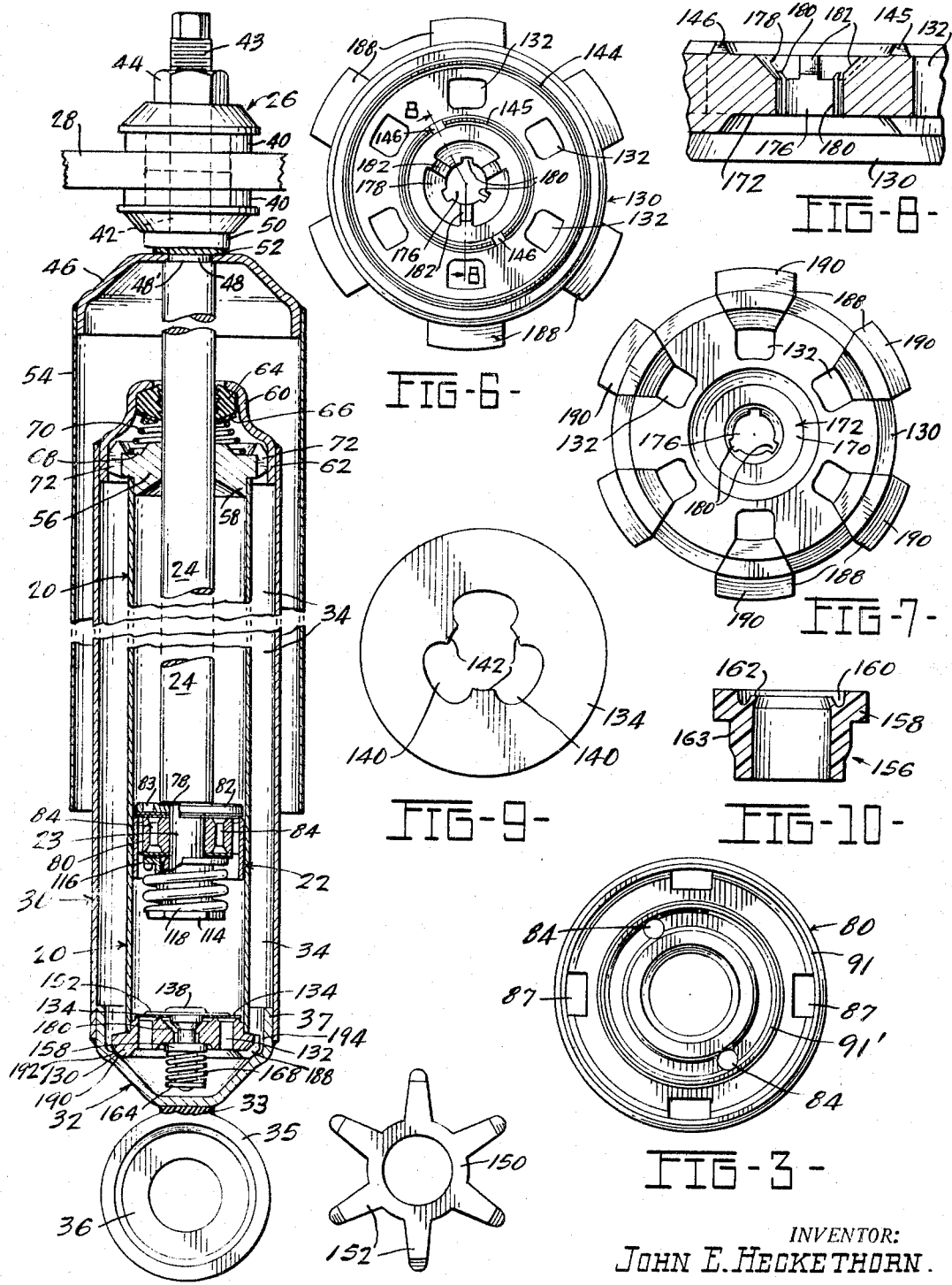
May 23, 1967     J. E. HECKETHORN     3,321,051
SHOCK ABSORBER
Original Filed March 15, 1963     2 Sheets-Sheet 1
INVENTOR:
JOHN E. HECKETHORN.
BY Harry O. Ernsberger
ATTORNEY.

United States Patent Office 3,321,051
Patented May 23, 1967

3,321,051
SHOCK ABSORBER
John E. Heckethorn, Dyersburg, Tenn., assignor, by mesne assignments, to Oldberg Manufacturing Company, Toledo, Ohio, a corporation of Michigan
Continuation of application Ser. No. 265,403, Mar. 15, 1963. This application June 24, 1966, Ser. No. 560,351
9 Claims. (Cl. 188—88)

This application is a continuation of application Ser. No. 265,403, filed Mar. 15, 1963, now abandoned.

This invention relates to hydraulic shock absorbers and more especially to shock absorbers of the two-way direct-acting type of a character adapted to control both the approaching and separating movements of two relatively movable components such as a frame and axle or wheel supporting means of a vehicle.

The invention more particularly relates to hydraulic shock absorbers of the direct-acting type wherein a piston and a piston valve arrangement are reciprocable in a working cylinder in combination with a liquid reserve chamber or reservoir and a base valve construction arranged between the working cylinder or working chamber and the reserve chamber, the piston rod and the cylinder being respectively connected to a vehicle frame and a vehicle wheel supporting means for controlling the vertical movements of the vehicle wheel.

The invention embraces the provision of a direct-acting shock absorber of this character embodying a piston and piston valve construction for effectively controlling fluid flow from one side of the piston to the other during compression and rebound strokes, the arrangement providing for comparatively low resistance to minor relative movements or low velocities between the piston and working cylinder but providing comparatively high resistance to substantial relative movements thereof.

An object of the invention is the provision of a shock absorber of a hydraulic, two tube, direct-acting type embodying a base or foot valve assembly for controlling flow of fluid in both directions between the working cylinder and the reserve chamber in order to provide effective control of flow of fluid during both compression and rebound relative movements of the piston and cylinder.

Another object of the invention is the provision of a base valve construction arranged between the working cylinder or chamber and a reserve chamber equipped with a resiliently biased valve means which is opened under comparatively high compression forces adapted to function as a "blow-off" or relief means.

Another object of the invention is the provision of a shock absorber of the hydraulic direct-acting type having a reserve chamber, piston and working cylinder combination with a piston valve construction and a base valve construction arranged to provide efficient and effective control for comparatively high and low fluid pressures and piston velocities developed by relative movements between the piston and working cylinder providing an improved ride for a vehicle over both smooth and irregular road surfaces.

Another object of the invention resides in a base valve or foot valve construction for a hydraulic double acting shock absorber wherein the base valve body is fashioned in a manner wherein the fluid passages in the valve body may be readily modified in size to attain desired restriction to fluid flow.

Another object of the invention is the provision of a base valve construction wherein the body of the base valve is configurated so as to automatically center the base valve assembly and working cylinder in an end cap forming a component of the shock absorber.

Another object of the invention is the provision of a "blow-off" or relief valve construction of nonmetallic material configurated to prevent leakage of fluid between the valve and its support whereby compression resistance may be accurately controlled.

Another object of the invention is the provision of a piston body and base valve body for a shock absorber fashioned of sintered iron or similar material facilitating the molding or pressing of these components at a low cost and with complete interchangeability.

Another object of the invention is the provision of a return flow or liquid replenishing valve for the base construction which is of light weight to promote rapid opening and closing of the valve, the valve being arranged for substantial opening movement providing large area for fluid flow with miimum restriction.

Another object of the invention resides in a base valve body or plate for a hydraulic, double-acting shock absorber configurated to function as an effective baffle for liquid issuing through the base inlet valve, the body being fashioned with comparatively large nonrestrictive passages to accommodate rapid flow of liquid into the working cylinder.

Another object of the invention embraces the provision of a piston construction embodying a metering disc shaped to provide a continuously open passage to accommodate fluid flow from one side of the piston to the other without appreciable resistance during small relative movements of the piston and working cylinder.

Still a further object of the invention is the provision of a base valve arrangement in a two tube, direct-acting shock absorber which is of simple construction and inexpensive to manufacture, and which is extremely durable and efficient in operation irrespective of wide ranges in operating temperatures.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a longitudinal sectional view through the shock absorber embodying the features of the invention;

FIGURE 2 is an enlarged longitudinal sectional view of a portion of the shock absorber shown in FIGURE 1 illustrating the piston and base valve constructions;

FIGURE 3 is a top plan view of the piston body showing the flow passages therein;

FIGURE 4 is a plan view of a flow metering disc forming a component of the piston valve assembly;

FIGURE 5 is a plan view of an inlet valve of the piston assembly;

FIGURE 6 is a top plan view of the base valve body;

FIGURE 7 is a bottom plan view of the base valve body;

FIGURE 8 is an enlarged detail sectional view taken substantially on the line 8—8 of FIGURE 6;

FIGURE 9 is a plan view of a replenishing valve member of the base valve construction;

FIGURE 10 is an enlarged detail sectional view illustrating a high pressure relief valve fashioned of nonmetallic material, and FIGURE 11 is a plan view of a biasing finger spring for controlling the replenishing valve of the base valve construction.

Referring to the drawings in detail and initially to FIGURE 1, the shock absorber is inclusive of a tubular member 20 providing a working cylinder in which is slidably disposed a piston and piston valve construction or assembly 22 secured on a tenon 23 or portion of reduced diameter formed at the lower end of a piston rod 24, the upper end of the piston rod being provided with a mounting construction 26 adapted to be secured to a member or bracket 28 carried by the frame construction of the vehicle with which the shock absorber may be used. The working cylinder 20 is surrounded by a second tubular member or cylinder 30 concentric therewith which, with an end cap 32, forms a liquid reserve chamber or reservoir 34.

Welded as at 33 to the end cap 32 is a lower mounting fixture 35 in which is disposed a grommet or bushing 36 having an opening therethrough to accommodate a member (not shown) secured to a vehicle axle or other vehicle wheel supporting means of conventional construction. The cap 32 is fashioned with a circular peripheral flange 37 which is welded throughout its periphery to the lower end region of the tube or cylinder 30.

The upper mounting 26 may comprise two bushings 40 adapted to surround a mounting stud 42 welded to a tenon 48 on the piston rod 24, the bushings extending into a mounting bracket or frame member 28, the shoulder portions of the bushings engaging the upper and lower surfaces of the mounting bracket or frame member. A portion of the stud 42 is threaded as at 43 to accommodate a nut 44 for securing the bushings 40 to the mounting member. Telescoped on the tenon 48 is an upper cap 46 which engages a shoulder 48' at the junction of the tenor 48 with the rod body 24. The enlarged head of the stud 42 is resistance welded as at 52 to the tenon 48, the weld 52 securing the cap 46 against the rod shoulder 48'.

Surrounding a peripheral region of the cap 46 is a third cylindrical member or sleeve 54 which is welded to the cap 46 and is concentric with the cylinder 30. The sleeve 54 provides a guard to prevent damage to the piston rod by flying stones or debris.

The upper adjacent end regions of the working cylinder 20 and the second cylinder 30 are adapted to be closed by suitable means to confine the liquid within the working cylinder 20 and the reservoir chamber 34. The upper end of the working cylinder 20 is provided with a closure in the form of a bushing, slidably accommodating the piston rod 24, the bushing 56 having an extension or tenon 58 snugly fitted into the upper end region of the working cylinder 20.

Disposed at the upper end of the cylinder 30 is a cap member 60 having a peripheral flange portion 62 welded to the end region of the cylinder 30 so as to form a fluid tight joint between the member 60 and the cylinder 30. Disposed within the cap member 60 is a packing gland or seal 64 of suitable material configurated to prevent leakage of fluid along the piston rod 24. Disposed contiguous with the lower surface of the gland 64 is a metal washer 66 and positioned between the washer 66 and an annular recess 68 formed in the rod guide bushing 56 is an expansive coil spring 70.

The spring 70 biases the packing gland 64 into sealing engagement with the surface of the piston rod 24. The rod guide bushing or member 56 is fashioned with peripherally arranged spaced notches 72 providing drain channels facilitating the return of fluid which seeps between the piston rod 24 and the guide bushing 56 to the reserve chamber or reservoir 34. Through this arrangement there is no loss of liquid and minute leakage along the rod 24 at the region of the bushing 56 prevents the region of the working cylinder above the piston from becoming air bound.

The piston and piston valve construction is illustrated particularly in FIGURES 2 through 5. Snugly telescoped onto the tenon 23 of the piston rod is a piston or piston body 80 preferably formed of sintered iron molded or pressed to the desired shape. Disposed adjacent the shoulder 78 between the rod body and tenon 23 is a backing plate or abutment plate 82. The abutment plate 82 is provided with a plurality of circumferentially spaced passages or openinsg 83, for example, five or six openings being preferred.

The piston 80 is fashioned with a plurality of circumferentially arranged spaced passages or channels 84. In the embodiment illustrated, two passages 84 are fashioned in the piston, but it is to be understood that a greater or lesser number may be used, depending upon the freedom or restriction of fluid flow desired. The piston is fashioned with a depending skirt 85 to provide an elongated bearing area for the piston. Disposed adjacent the upper surface of the piston is a disc-like inlet valve 86.

The valve 86 is shown in FIGURE 5 and is preferably of a thickness of between seven thousandths and twelve thousandths of an inch. The valve 86 is formed with a central opening 87 to accommodate the tenon 23 of the piston rod. The disc valve 86 is formed with a partial annular slot 88 defining a hub portion 89, the unslotted portion providing a connecting portion or bridge 90 as shown in FIGURE 5. Through this construction of inlet valve, the peripheral region of the valve may be flexed even though the central hub portion 89 is securely held against flexure.

The peripheral region of the disc valve 86 engages a circular seat provided by the upper peripheral edge 91 of the sleeve portion 85 of the piston and a second circular seat provided by a circular ridge 91' concentric with the circular seat 91. The disc valve 86 is resiliently biased toward its seating or closed position by a star-shaped resilient plate or spring 92 having a hub portion 93 positioned between the disc valve 86 and the abutment plate 82. The resilient means 92 is fashioned with a plurality of radially extending fingers 94, preferably six fingers which engage the disc valve 86, as shown in FIGURE 2.

The abutment plate 82 is fashioned with an annular recess 96 providing clearance space into which the fingers 94 of the spring 92 are flexed when hydraulic pressure developed beneath the piston moves the disc valve 86 from its seat to facilitate flow of liquid into the region above the piston. The backing plate 82 is of a diameter slightly less than the interior diameter of the working cylinder 20 providing an annular passage 98 to facilitate upward flow of liquid when the valve 86 is flexed to open position.

The piston assembly is inclusive of a rebound valve arrangement for facilitating fluid flow from the rod region of the working cylinder into the region beneath the piston. As shown in FIGURE 2, a rebound disc valve 102 is disposed beneath the lower surface of the piston 80.

A metering disc 104, shown in FIGURES 2 and 4, is disposed between the piston 80 and the disc valve 102. The peripheral region of the metering disc 104 seats against a circular ridge 106 formed on the piston 80. The disc valve 102 is of annular shape having a central opening to accommodate the tenon 23 of the piston rod 24.

Threaded upon a threaded portion 81 of the tenon 23 is a piston nut 110. Surrounding the upper portion of the nut 110 is an annular member of spring retainer 112. Disposed between a flange 114 formed on the nut 110 and the flange portion 116 of the member 112 is a comparatively strong expansive coil spring 118. The respective ends of the spring are fashioned with flat portions so as to properly seat against the flange 114 on the nut and the flange 116 on the annular member. The flange 116 of the annular member 112 engages the rebound disc valve 102. The expansive pressure of the spring 118 holds the rebound disc valve in closed position and the metering disc 104 in engaged relation with the circular seat 106 on the piston.

The metering disc 104, as shown in FIGURE 4, is provided with one or more metering notches or passages depending upon the size of a permanent bleed passage means desired to facilitate desired flow of liquid from one face to the other, the rate of flow being dependent upon the number and size of the metering notches. In the metering disc shown in FIGURE 4, one passage or notch 120 is provided but, as shown in broken lines, one or more additional openings 120' may be provided, if desired.

The purpose of the permanent bleed passage means, provided by one or more openings 120 or 120' is to offer fixed resistance to minor relative movements between the piston and the working cylinder such as may be caused by slight road irregularities. Disposed between the upper end of the nut 110 and the disc valve 102 is an annular washer 122 to enable drawing up the nut 110 without damaging the disc valve 102.

Sufficient clearance is provided between the nut 110 and the annular member 112 to facilitate movement of the retainer 112 with respect to the nut 110 when the disc valve 102 and the metering disc 104 are flexed by fluid pressures developed in the working cylinder above the piston to effect flow of liquid from the rod end of the piston to the region beneath the piston. The paths of liquid flow on compression and rebound strokes of the shock absorber will be hereinafter described.

The base valve or foot valve construction of the invention and components thereof are particularly shown in FIGURES 2 and 6 through 11. The base valve construction includes a valve plate or body 130 particularly shown in FIGURES 2 and 6 through 8. The body is formed with a plurality of circumferentially spaced openings 132, each being of substantial area, there being six openings in the embodiment illustrated. The size and number of the openings is such as to accommodate passage of substantial volume of liquid on the rebound or extension stroke of the piston rod with a minimum of flow resistance.

The base or foot valve construction is provided with two valve means, a first valve means being mounted above the body 130 for the purpose of admitting flow of liquid from the reserve chamber or reservoir 34 into the working cylinder into the region between the piston and the base valve, the second valve means being arranged at the opposite or lower side of the body 130. The first valve means comprises a disc valve 134 which has a central opening accommodating an enlarged portion 136 of a rivet 138.

As shown in FIGURE 9, the disc valve 134 is fashioned with a plurality of generally segment-shaped open areas 140 defined by radially-disposed inwardly-extending tabs or lugs 142, the lugs engaging spaced regions of the enlarged portion 136 of the rivet to center the disc valve 134. The body 130, preferably made of sintered iron, is fashioned with two concentric circular ridges or raised portions 144 and 145, shown in FIGURE 6, which form seats for the disc valve 134. The head of the rivet provides an outwardly extending flange or ledge 148.

Disposed between the disc valve 134 and the ledge or flange 148 of the rivet 138 is a resilient member or plate spring 150 having an annular central hub received on the enlarged portion 136 of the rivet and seating on the ledge 148. The spring 150, shown in FIGURE 11, is fashioned with a plurality of radially arranged resilient fingers 152 biasing the disc valve 134 toward closed position in engagement with the circular seats 144 and 145.

The spaces between the radially arranged fingers 152 of the spring 150 together with the segment-shaped passages or openings 140 in the disc valve 134 provide for fluid flow through valve disc 134 under conditions hereinafter explained.

The inner circular valve seat 145 is usually provided with one or more small notches 146, as shown in FIGURE 6, to provide restricted passage means open at all times irrespective of the position of the valve 134 to facilitate restricted flow of fluid out of the working cylinder during the compression stroke as successive portions of the piston rod enter the working cylinder and prior to unseating of a sleeve "blow-off" valve hereinafter described. The notch or notches 146 may be of a number and of a size to obtain a desired restriction to meter flow of liquid through the passage means there being two diametrically arranged notches in the embodiment illustrated.

A second valve means is associated with the body 130 and the rivet 138 for facilitating controlled flow of liquid from the region of the working chamber beneath the piston assembly and through the base valve construction during the compression stroke as successive portions of the piston rod enter the working cylinder 20 at higher velocities than previously described and acts as a "blow-off" valve to relieve predetermined high fluid pressures. As particularly shown in FGURE 2, the shank 139 of the rivet 138 is of smooth cylindrical shape and surrounding the shank is a valve member 156 of sleeve-like construction which is slidable along the shank of the rivet.

The sleeve-like valve member 156 is preferably fashioned of nonmetallic material, such as resinous plastic, which may be a polyamide resin (nylon) preferably glass fiber reinforced. The normal configuration of the sleeve-like valve 156 is shown in FIGURE 10 and includes an outwardly extending flange portion 158, a circular recess 160 which provides a lip portion 162 and a thickened portion 163 to center the end of spring 168 and reinforce the flange 158.

The sleeve valve 156 is molded in a manner whereby the lip portion 162 extends a slight distance inwardly of the bore in the valve whereby, in assembly, the lip portion 162 is stretched or tensioned in snug engagement with the shank 139 of the rivet 138. The lip portion 162, by reason of its reduced cross-section, is flexible and engages the shank of the rivet to prevent leakage of liquid between the rivet and the sleeve valve 156. Furthermore, pressure of liquid established by a compression stroke, acting on the lip portion 162 forces or compresses the lip portion 162 tightly against the shank of the rivet to establish a positive leakproof seal.

Secured to the rivet 139 is an abutment washer or member 164 having a hub portion 165 fitted onto a reduced portion of the shank 139 of the rivet. After assembly, the end of the rivet is swaged into the cup-like recess of the member 164 to form an expanded portion 166, as shown in FIGURE 2.

Disposed between the washer 164 and the flange 158 of the sleeve-like valve 156 is a comparatively strong expansive coil spring 168 which abuts against the washer 164 and normally biases the valve 156 to closed position wherein the flange 158 snugly seats against an annular surface 170 formed on the body 130.

The body 130 is fashioned with a recess 172 defining the surface 170 to accommodate the flange portion 158 of the sleeve valve 156 and provide a compact construction. The body 130 is fashioned with a bore 176 in communication with conically-shaped recessed regions 178, as shown in FIGURES 6 and 8. The bore 176, in the embodiment illustrated, is formed with three circumferentially spaced notches 180 providing metering passageways along the shank 139 of the rivet.

The notches 180 may be of a depth and width to secure the desired metering of liquid flow from the region above the base valve to the reserve chamber during "blow-off" viz. when the sleeve valve 156 is opened as successive increments of piston rod 24 entering working cylinder 20 and of necessity displace an equivalent volume of working fluid from that cylinder during the compression stroke, particularly during high velocity piston rod movement. Thus the metering of liquid flow through the base valve construction on compression strokes is provided by the combined area of the notches 180. The conically-shaped spaced recessed regions 180 define spaced lands 182 which form abutment means engageable with the region 184 of the rivet 138 to position the flange 148 thereof a desired distance above the valve body 130.

The valve body 130 is fashioned with a plurality of outwardly extending circumferentially spaced lugs 188, as shown in FIGURES 2, 6 and 7, having angular surfaces 190 which engage a frusto-conical surface 192 interiorly of the cap member 32, as shown in FIGURE 2. The peripheral surface regions of the lugs 188 are of slightly lesser dimension than the diameter of the interior cylindrical surface of the cap 32 providing slight clearance spaces 194, as shown in FIGURE 2.

In assembly, the angular or cone-shaped surfaces 190 of the circumferentially spaced lugs 188 engage the angular or cone-shaped surface 192 to further center the foot valve assembly and the cylinder 20 with respect to the cap 32. The cap 32 is fashioned with an interior circular recess or depression 196 to assure that the lugs 188 seat properly upon the interior conically-shaped surface of the cap 32.

The operation of the shock absorber is as follows: During small or minor movements of the piston assembly relative to the working cylinder caused by slight road irregularities, fluid flow occurs in either direction through one or more notches in the metering disc 104 and through the notches or passageways 146 formed in the circular ridge 145 of the body 130 of the base valve construction whereby predetermined resistance is offered to low velocity relative movements of the piston and working cylinder.

Upon the vehicle wheel encountering a substantial obstruction in the roadway, and the vehicle wheel being forced upwardly, the fluid within the working cylinder is instantly subjected to high compression forces as successive increments of the piston rod are forced into the working cylinder. At the same time, fluid between the base valve and the piston is forced through the piston assembly through passages 87, the hydraulic pressure causing the disc valve 86 which is shown in FIGURE 2 in closed position to be flexed to open position to permit passage of fluid past the valve seat 91 and through the annular space surrounding the abutment plate 82 into the piston rod end of the working cylinder.

In reference to the base valve assembly, the high hydraulic pressure acts upon the sleeve valve 156 to compress the spring 168, sliding the valve along the shank 139 of the rivet to open position whereby liquid flows from the working cylinder into the reserve chamber 34 by way of the metering passages 180 adjacent the shank of the rivet 138 past the flange 158 of the valve 156 through the spaces between adjacent lugs 188 into the reserve chamber 34.

The force of the spring 168 biasing the sleeve valve 156 toward closed position is comparatively strong, requiring comparatively high fluid pressure within the working cylinder to unseat this valve and permit return to the reserve chamber of fluid in excess of the quantity of fluid which flows into the rod end of the working cylinder through the piston compression passages 87, the disc valve 86 being open sufficiently to facilitate rapid flow of fluid into the rod end of the working cylinder.

Through this valve arrangement, substantial resistance to flow of liquid past the "blow-off" valve 156 into the reserve chamber is provided. The valve 156 provides a controlled "blow-off" or pressure relief means so as to provide substantial resistance to relative movement of the piston and base valve assemblies toward each other on compression strokes and to assure proper transfer of fluid into the rod end of the cylinder.

The flow paths of the fluid on a rebound or extension stroke as separation movement between the piston and the base valve occurs is as follows: As successive portions of the piston rod are withdrawn from the working cylinder and the volume within the working cylinder increases, fluid flow through the piston assembly takes place through the passages 83 in the abutment plate 82, through the circular slot 88 in the disc valve 86 and through the passages 84 in the piston body.

The hydraulic pressure in the rod end of the working cylinder builds up to an extent compressing the comparatively strong spring 118 by flexing the disc valve 102 and the metering disc 104 downwardly, thereby effecting flow of fluid past the valve seat 106 on the piston body 80 into the region between the piston assembly and the base valve assembly.

As the volume of the region in the working cylinder increases as the piston assembly and base valve assembly are moved away from each other on a rebound stroke, liquid from the reserve chamber 34 flows through the spaces between the lugs 188 through the passages 132 in the base valve body 130, opening the disc replenishing valve 134 which is moved upwardly facilitating flow of fluid past the circular valve seats 144 and 145 to fill the enlarging volume in the working cylinder by liquid from the reserve chamber.

The above described paths of travel or transfer of the liquid into and away from the working cylinder through the base valve construction and into and away from the rod end region of the working cylinder are repeated during every compression stroke and rebound stroke of sufficient magnitude to cause the opening or closing of the several valves in the manner above described. The pressure at which the disc valve 102 is opened to effect fluid flow through the piston passages 84 may be varied by employing a spring 118 of lesser or greater strength to thereby regulate the biasing force to be overcome by the pressure in the rod end of the working cylinder.

The pressure at which the "blow-off" valve 156 is opened may be controlled by employing a spring 168 of different expansive force. A liquid is employed in the shock absorber which is of substantially constant viscosity throughout the normal temperature range encountered in the use of shock absorbers whereby the flow of the liquid through the valved passages is only slightly affected by temperature changes so that satisfactory operation of the shock absorber irrespective of ambient temperature variations is attained.

It is apparent that, within the scope of the invention, modifications and different arrangements may be made other than as herein disclosed, and the present disclosure is illustrative merely, the invention comprehending all variations thereof.

I claim:

1. A hydraulic shock absorber including a working cylinder and a reserve chamber, a piston assembly reciprocable in the working cylinder, closure means for one end of the working cylinder and reserve chamber, a piston rod connected with the piston assembly and extending through the closure means, a base valve assembly at the opposite end of the working cylinder, a cap member for an end of the reserve chamber adjacent the base valve assembly, said piston assembly including a body mounted on the piston rod and formed with passageways therethrough, an abutment plate mounted on said rod, a first disc valve between the piston and plate and normally engaging a circular seat on the piston, resilient means biasing said first disc valve toward the seat, a second disc valve adjacent the opposite side of the piston body, means providing a permanent restricted bypass channel adjacent the second disc valve whereby to provide limited flow of fluid through the piston independently of the valves, said base valve assembly at the end of the working cylinder including a base plate of sintered iron with channels extending through the plate, inlet and exhaust valves arranged to control fluid flow through the channels in the plate, said cap member having a frusto-conically shaped surface, said base plate being provided with peripherally-spaced radially-extending projections arranged to engage the frusto-conically shaped surface of the cap member for centering the base valve assembly and working cylinder with respect to the cap member, the spaces between adjacent projections on the valve body providing passages for flow of liquid into and out of the reserve chamber.

2. A base valve construction for a direct-acting hydraulic shock absorber having a working cylinder and piston and reverse chamber, a base plate formed with a central cylindrical opening and a plurality of circumferentially spaced passages therethrough, an inlet valve at one side of said plate arranged to control flow of fluid through the circumferentially spaced passages, a rivet having a head portion and a shank portion, resilient means engageable with the head portion biasing the inlet valve toward closed position, the shank portion being cylindrical in cross-section and extending through the central opening in the plate, channel means formed in the plate, a sleeve-like relief valve slidably mounted on the shank portion of the rivet and arranged to control flow of fluid through the channel means, resilient means normally biasing the relief valve toward closed position, said relief valve being formed of resinous material, one end of the relief valve being formed with a circular recess defining a circular lip portion of an internal diameter less than the diameter of the shank portion whereby in assembly the shank portion distends the lip portion into sealing engagement with the shank portion, said lip portion being arranged to be subjected to fluid pressure to bias the lip portion in sealing engagement with the shank portion.

3. A base valve construction for a direct-acting hydraulic shock absorber having a working cylinder and piston and reserve chamber, a base plate formed with a central cylindrical opening and a plurality of circumferentially spaced passages therethrough, an inlet valve at one side of said plate arranged to control flow of fluid through the circumferentially spaced passages, means associated with said inlet valve providing a restricted permanent bypass for fluid flow independent of the position of the inlet valve, a member extending through the central opening in the plate, said member having a flange portion and a shank portion, resilient means cooperating with the flange portion biasing the inlet valve toward closed position, said plate having notches therein in communication with the central cylindrical opening providing channel means in the plate, a relief valve slidably mounted on the shank portion of the member and arranged to control flow of fluid through the channel means, resilient means normally biasing the relief valve toward closed position, said relief valve being formed of resinous material, one end of the relief valve being formed with a circular recess defining a circular lip portion of an internal diameter less than the diameter of the shank portion whereby in assembly the shank portion distends the lip portion into engagement with the shank portion, said lip portion being ararnged to be subjected to fluid pressure to force the lip portion in sealing engagement with the shank portion.

4. A base valve construction for a direct-acting hydraulic shock absorber having a working cylinder and piston and reserve chamber, a base plate having a plurality of circumferentially spaced passages therethrough, an inlet valve at one side of said plate arranged to control flow of fluid through the circumferentially spaced passages, a member having a flange portion and a cylindrical shank portion and an enlarged portion joining the flange portion and shank portion, resilient means cooperating with the flange portion biasing the inlet valve toward closed position, a central cylindrical opening in the plate through which extends the shank portion of said member, spaced notches in said plate in communication with the central opening and forming with the shank portion of said member a plurality of channels, the entrance region of the central opening being formed with spaced recesses in communication with said notches, the regions between the spaced recesses forming abutment means engageable with the enlarged portion of said member for defining the position of the member relative to the plate, a relief valve slidably mounted on the shank portion of the member and arranged to control flow of fluid through the channel means and the recesses, and resilient means normally biasing the relief valve toward closed position.

5. A base valve construction for a direct-acting hydraulic shock absorber having a working cylinder and piston and reserve chamber, a base plate having a plurality of circumferentially spaced passages therethrough, an inlet valve adjacent one face of said plate arranged to control flow of fluid through the circumferentially spaced passages, a rivet having a head and a cylindrical shank portion and an enlarged frusto-conically shaped portion joining the head and shank portion, resilient means engageable with the head biasing the inlet valve toward closed position, a central cylindrical opening in the plate through which extends the shank portion of the rivet, said plate being formed with spaced notches in communication with the central cylindrical opening and forming with the shank portion of said rivet a plurality of channels, the entrance region of the central opening being frusto-conically shaped and formed with spaced recesses establishing communication with said notches, the regions between the spaced recesses forming abutment means engageable with the enlarged portion on the rivet for defining the position of the rivet relative to the plate, a sleeve-like relief valve slidably mounted on the shank portion of the rivet and arranged to control flow of fluid through the channel means and the recesses, resilient means normally biasing the relief valve toward closed position, said relief valve being formed of resinous material.

6. A base valve construction for a direct-acting hydraulic shock absorber having a working cylinder and piston and reserve chamber, a base plate having a plurality of circumferentially spaced passages therethrough, an inlet valve adjacent one face of said plate arranged to control flow of fluid through the circumferentially spaced passages, a rivet having a head and a shank portion and an enlarged portion joining the head and shank portion, resilient means cooperating with the head biasing the inlet valve toward closed position, a central cylindrical opening in the plate through which extends the shank portion of the rivet, spaced notches in said plate in communication with the central opening and forming with said rivet a plurality of channels, said plate having recessed regions adjacent the entrance of the central opening in communication with said notches, said recessed regions being bounded by inwardly extending projections providing abutment means engageable with the enlarged portion on the rivet defining the position of the rivet relative to the plate, a sleeve-like relief valve slidably mounted on the shank portion of the rivet and arranged to control flow of fluid through the channel means and the recessed regions in the plate, resilient means normally biasing the relief valve toward closed position, said relief valve being formed of resinous material, the end portion of the relief valve adjacent the channel means having a circular recess defining a lip portion of an internal diameter less than the diameter of the shank portion of the rivet whereby, in assembly, the shank portion distends the lip portion into sealing engagement with the shank portion.

7. A base valve construction for a direct-acting hydraulic shock absorber having a working cylinder and piston and reserve chamber, a base plate having a plurality of circumferentially spaced passages therethrough, an inlet valve adjacent one face of said plate arranged to control flow of fluid through the circumferentially spaced passages, a rivet having a flange portion and a shank portion and an enlarged portion joining the flange portion and shank portion, said enlarged portion being joined with the shank portion by a frusto-conically shaped surface, resilient means cooperating with the flange portion biasing the inlet valve toward closed position, a central opening in the plate through which extends the shank portion of the rivet, said plate being formed with spaced notches in communication with the central opening and forming with said rivet a plurality of channels, the entrance region of the central opening being formed with frusto-conically shaped, circumferentially spaced recesses establishing communication with said notches, the portions of the plate between the frusto-conically shaped, circumferentially spaced recesses forming abutment means engageable with the frusto-conically shaped surface on the rivet for defining the position of the rivet relative to the plate, a sleeve-like relief valve slidably mounted on the shank portion of the rivet and arranged to control flow of fluid through the channel means and the recesses, resilient means supported by the rivet normally biasing the relief valve toward closed position, said relief valve being of resinous material, the end portion of the relief valve adjacent the channel means having a circular recess defining a lip portion of an internal diameter less than the diameter of the shank portion of the rivet whereby, in assembly, the shank portion distends the lip portion into sealing engagement with the shank portion.

8. A base valve construction for a direct-acting hydraulic shock absorber having a working cylinder and piston and reserve chamber, a base plate member having a plurality of circumferentially spaced passages therethrough, an inlet valve adjacent one face of said plate member arranged to control flow of fluid through the circumferentially spaced passages, a rivet member having a head and a shank portion and an enlarged portion joining the head and shank portion, resilient means cooperating with the head biasing the inlet valve toward closed position, a central opening in the plate member accommodating the rivet member, the opening in the plate member having surfaces respectively reciprocal in shape to a surface of the enlarged portion and to a surface of the shank portion of the rivet member, one surface of one pair of reciprocally shaped surfaces having spaced notches therein and one surface of the other pair of reciprocally shaped surfaces having recessed regions in communication with said notches providing channel means, the surface defining the enlarged portion of the rivet member being engageable with the reciprocally shaped surface of the plate member to define the position of the rivet member relative to the plate member, a sleeve-like relief valve slidably mounted on the shank portion of the rivet member and arranged to control flow of fluid through the channel means, resilient means normally biasing the relief valve toward closed position, said relief valve being formed of resinous material, the end portion of the relief valve adjacent the channel means having a circular recess defining a lip portion of an internal diameter less than the diameter of the shank portion of the rivet whereby, in assembly, the shank portion distends the lip portion into sealing engagement with the shank portion.

9. A base valve construction for a direct-acting hydraulic shock absorber having a working cylinder and piston and reserve chamber, a base plate member having a plurality of circumferentially spaced passages therethrough, an inlet valve adjacent one face of said plate member arranged to control flow of fluid through the circumferentially spaced passages, a rivet member having a flange portion and a shank portion defined by a cylindrical surface and an enlarged portion joining the flange portion and shank portion, said enlarged portion having a frusto-conically shaped surface, resilient means cooperating with the flange portion biasing the inlet valve toward closed position, a central opening in the plate member accommodating the rivet member, the central opening in the plate member having a frusto-conically shaped surface reciprocal to the frusto-conically shaped surface of the rivet member and a cylindrical surface fitting the cylindrical surface of the rivet member, one of said frusto-conically shaped surfaces having a plurality of spaced recesses and one of the cylindrical surfaces having a plurality of spaced notches, said recesses and said notches providing channel means, the frusto-conically shaped surfaces being in engagement and defining the position of the rivet member relative to the plate member, a sleeve-like relief valve slidably mounted on a shank portion of the rivet and arranged to control flow of fluid through the channel means, resilient means supported by the rivet normally biasing the relief valve toward closed position, said relief valve being of resinous material, the end portion of the relief valve adjacent the channel means having a circular recess defining a lip portion of an internal diameter less than the diameter of the shank portion of the rivet whereby, in assembly, the shank portion distends the lip portion into sealing engagement with the shank portion.

References Cited by the Examiner
UNITED STATES PATENTS
2,576,637 11/1951 Patriquin.

FOREIGN PATENTS
459,485 9/1949 Canada.

MILTON BUCHLER, *Primary Examiner.*
G. E. HALVOSA, *Assistant Examiner.*